United States Patent [19]
Milliman

[11] Patent Number: 5,888,300
[45] Date of Patent: Mar. 30, 1999

[54] CROSS-HEAD DIE APPARATUS AND IMPROVED DIE MEMBER THEREFOR

[76] Inventor: James A. Milliman, 8644 Emerald Cir. South, Rome, N.Y. 13440

[21] Appl. No.: 738,475

[22] Filed: Oct. 28, 1996

[51] Int. Cl.$^6$ .................................................. B05C 3/02
[52] U.S. Cl. ................ 118/407; 118/420; 118/DIG. 18; 118/DIG. 19; 118/DIG. 22; 425/113
[58] Field of Search .................................. 118/407, 420, 118/DIG. 18, DIG. 19, DIG. 22; 277/208; 425/113

[56] References Cited

U.S. PATENT DOCUMENTS

| | | | |
|---|---|---|---|
| 3,947,173 | 3/1976 | Dougherty | 425/113 |
| 4,622,239 | 11/1986 | Schoenthaler et al. | 118/410 |
| 5,031,568 | 7/1991 | Milliman | 118/419 |
| 5,160,541 | 11/1992 | Fickling et al. | 118/DIG. 18 |
| 5,183,669 | 2/1993 | Guillemette | 118/DIG. 18 |
| 5,316,583 | 5/1994 | Milliman | 118/420 |
| 5,507,505 | 4/1996 | Von Ardnt et al. | 277/208 |
| 5,540,775 | 7/1996 | Milliman | 118/420 |

FOREIGN PATENT DOCUMENTS 1707383  12/1989  U.S.S.R. ................. 251/326

*Primary Examiner*—Peter Chin
*Assistant Examiner*—Michael P. Colaianni
*Attorney, Agent, or Firm*—George R. McGuire

[57] ABSTRACT

A die member forming a component of cross-head die apparatus is configured to facilitate removal of the die member from the axial bore of the body of the apparatus following assembly of a die member at room temperature with a body at elevated temperature. The external, frusto-conical surface of prior art die members is provided with recessed portions which do not contact the opposing surface of the axial bore in the body. Also, the angle of taper of the conical plane of the mating die member and body bore surfaces is increased to 7° from the prior art standard of 5°.

8 Claims, 3 Drawing Sheets

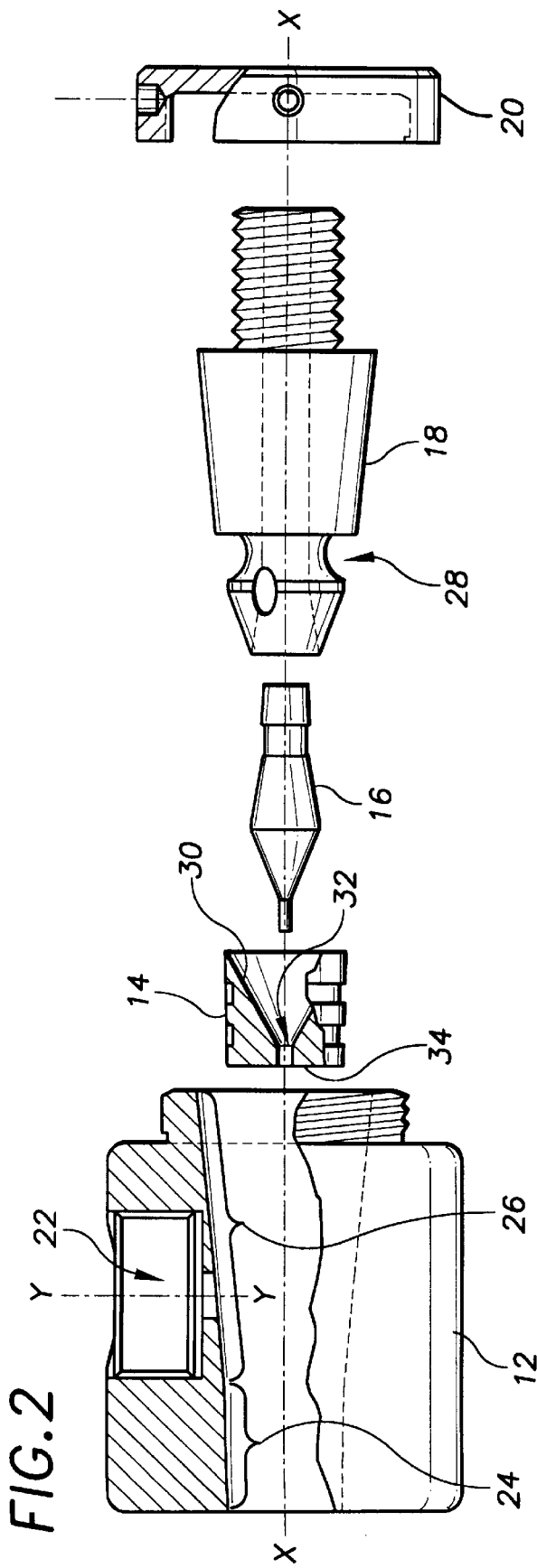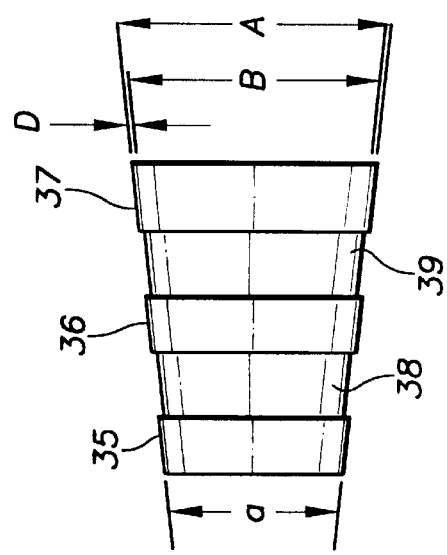

CROSS-HEAD DIE APPARATUS AND IMPROVED DIE MEMBER THEREFOR

BACKGROUND OF THE INVENTION

The present invention relates to die apparatus of the cross-head type and, more specifically to improved configurations of tapered die members used in cross-head apparatus.

Reference is made to applicant's U.S. Pat. Nos. 5,031,568 and 5,316,583 which disclose cross-head die apparatus incorporating a die member (also termed a flow guide member) having a frustoconical external surface. In the former patent the die/flow guide is positioned in a die holder with its entire external surface in mating engagement with a like-tapered, frustoconical internal surface of the die holder which, in turn, is positioned in a frustoconical cavity or bore in the body of the apparatus. In the latter patent, the entire external surface of the die member is in mating engagement with the forward portion of the axial bore in the body.

Molten plastic or other flowable coating material is injected through a radial bore into the die body and distributed about a filamentary member which is moved axially through guide elements within the body axial bore, exiting through an orifice in the front end of the die member with a uniform coating of the plastic. It is necessary to maintain the coating material at elevated temperatures in order to provide the proper viscosity. For this purpose, electric heating jackets are usually mounted on the body of the die apparatus. Thus, when in operation, all components of the cross-head die apparatus are heated to elevated temperatures.

It is necessary to disassemble the component parts of the apparatus from time to time for repair, cleaning, maintenance, etc. It has been found that the die member is sometimes difficult to dislodge from the body, a condition which most commonly occurs after a die member at room temperature has been assembled with a heated body. After the apparatus has been operated for some time and the temperature of the components then reduced prior to disassembly, the amount of force required to dislodge the die member may cause extensive damage to the parts. Heating the die member to at or near the temperature of the body prior to assembly may alleviate the problem, but operators frequently neglect to ensure that the die member has been heated to the necessary temperature prior to assembly.

Accordingly, it is a principal object of the present invention to provide a frustoconical die member for use in cross-head die apparatus which may be disassembled by application of less force than is necessary with typical prior art equipment.

A further object is to provide a frustoconical die element which may be disassembled from cross-head die apparatus without damage to the parts after having been assembled with the die member at room temperature and the body at an elevated temperature.

Another object is to provide, in cross-head die apparatus, the combination of a body with an internal cavity defined by a frustoconical surface and a die element having an external configuration for mating engagement with such surface which nevertheless may be disassembled without excessive force.

Other objects will in part be obvious and will in part appear hereinafter.

SUMMARY OF THE INVENTION

In order to maintain the necessary tolerances, particularly the concentricity of the die member surfaces and die orifice, it is desirable to make the included angle of the frustoconical external surface, and consequently the surface with which it mates, relatively small. For example, previously mentioned U.S. Pat. No. 5,031,568 suggests that the included angle of conical taper of these mating surfaces be 5°, a value which has been adopted and consistently used in commercial embodiments of cross-head die apparatus having frustoconical die members. Furthermore, in the disclosed embodiments of both of the aforementioned patents, as well as in commercial embodiments of such apparatus, the die members have a uniform, uninterrupted, frustoconical, external surface positioned in mating engagement over its entire area with an opposing bore surface.

It has been found that one or more portions of the external surface of the die member may be relieved, i.e., recessed from the frustoconical plane in which the surface matingly engages the opposing surface of the bore, without adversely affecting operation of the apparatus. In the preferred embodiment, the recessed area is formed by turning down, e.g., with a lathe, one or more axial segments of the frustoconical surface of the die member in area(s) intermediate of its front and rear ends. The recessed segment(s) lie(s) on a frustoconical plane spaced inwardly, e.g., by 0.020", from the plane of the mating surface. In the illustrated embodiment, the mating surface is in three separate segments, one adjoining each end of the die member and each separated from an intermediate segment by recessed segments. The total surface area of the recessed segments is preferably less than half the total surface area of the surface mating segments, e.g., about 40–45%.

It has further been found that the included angle of taper of the frustoconical, mating surfaces may be somewhat larger than that of the prior art while still maintaining the same tolerances. In the preferred embodiment, the angle is increased from 5° to 7°. The force required to dislodge a die member which has been placed while at room temperature into mating engagement with the bore of a body at elevated temperature is significantly reduced by forming a recessed portion in the frustoconical, external, mating surface. The required force is further reduced, in a die member having a recessed surface portion, by increasing the included angle of taper of the mating surfaces to about 7°. In fact, the force required to dislodge die members having both recessed surface areas and increased taper angles is less than half the force required to dislodge prior art die members.

The foregoing and other features of the improved die member of the invention and its combination with a cross-head die body will be more readily understood and fully appreciated from the following detailed description, taken in conjunction with the accompanying drawings.

BRIEF DESCRIPTION OF THE DRAWINGS

FIG. 2 is an exploded view, also in side elevation and partly in section, of the cross-head die apparatus of FIG. 1;

FIG. 3 is an enlarged, side elevational view of the die element of the invention.

DETAILED DESCRIPTION

Figure 1:
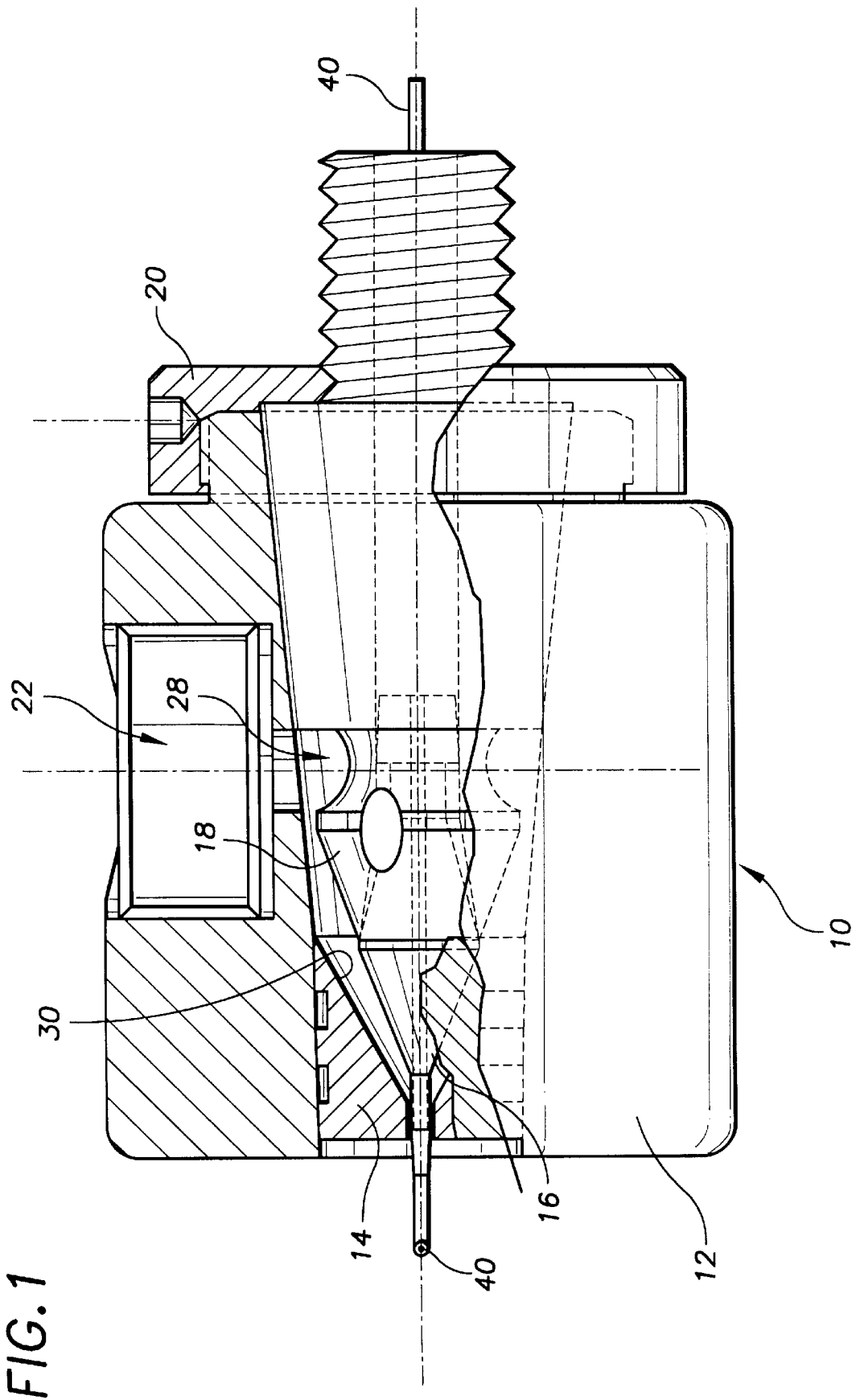
FIG. 1 is a side-elevational view, partly in section, of cross-head die apparatus incorporating the present invention.

Referring now to the drawings, cross-head die apparatus 10 incorporating the present invention is shown in fully assembled condition in FIG. 1, and with the component parts axially separated in FIG. 2. Components of apparatus 10 include body 12, die member 14, tip 16, tip holder 18, and collar 20. Body 12 includes radial bore 22 having central axis Y-Y, and an axial bore defined by forward and rear surface portions 24 and 26, respectively, and having central axis X-X. As explained in greater detail hereinafter, portions of the external surface of die member 12 matingly engage opposing portions of forward bore portion 24 when the components are assembled and operating. The rear portion of tip 16 fits within the forward portion of tip holder 18, and the conically tapered, rear portion of the external surface of tip holder 18 matingly engages rear surface portion 26 of body 12.

Molten plastic, rubber, or other such coating material is injected into apparatus 10 through radial bore 22, flows around annular groove 28 in tip holder 18 and forwardly through the annular passage between the forward end of the tip holder and surrounding surface portions of the axial bore of body 12. The portion of tip 16 extending forwardly of tip holder 18 is surrounded, in spaced relation, by internal, frustoconical surface 30 of die member 14. Die orifice 32 in front wall 34 of die member 14 communicates with the flow guide passageway formed by tip 16 and surface 30.

Filamentary member 40 is taken from a supply (not shown) rearwardly of apparatus 10 and passes through a guide passageway in tip 16 to exit the forward end of apparatus 10 through die orifice 32. The diameter of orifice 32 is larger by a predetermined amount than the diameter of member 40, whereby coating material also flows through orifice 32 to form an evenly distributed coating on member 40. Reference may be had to the aforementioned patents for any other details of construction, assembly and operation of apparatus 10.

Figure 4:
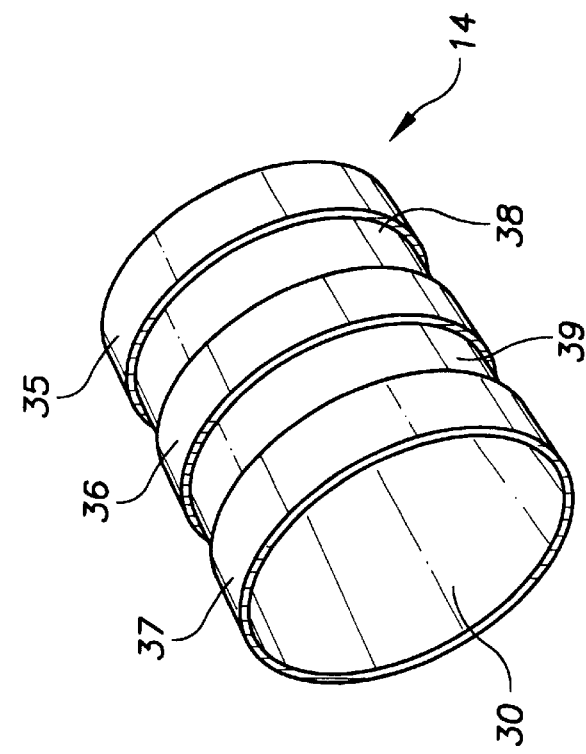
FIGS. 4 and 5 are front and rear perspective views, respectively, of the die member.
Figure 5:
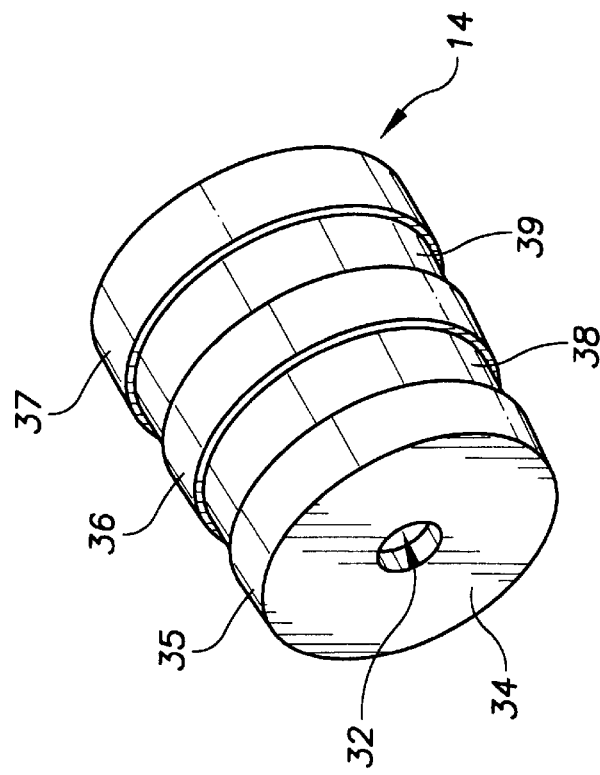

Die member 14, with which the present invention is most directly concerned, is shown individually and in more detail in FIGS. 3–5. As previously mentioned, die orifice 32 which is of precisely controlled diameter and precisely concentric with the external surface of the die member, extends through planar front wall 34 to communicate with the flow passage defined by internal surface 30 and the forward end of tip 16. As in prior art die members of this type, surface 30 lies entirely in a frustoconical plane extending from the rear end of die member 14 to the communication with orifice 32.

The external surface of die member 14 is seen to include three axial segments 35, 36 and 37, lying on a common, conical plane, indicated in the side view of FIG. 3 by letter A. Segments 35 and 37 adjoin the front and rear ends, respectively, of die member 14 and are separated from intermediate segment 36 by axial segments 38 and 39, respectively. Segments 38 and 39 lie on a common, conical plane B which is concentrically surrounded by plane A. Plane B is spaced inwardly from plane A by distance D which, for practical purposes, may be on the order of 0.020". Preferably, the axial lengths of segments 38 and 39 are equal to one another and somewhat longer than the axial lengths of segments 35, 36 and 37, which are also equal to one another. The combined surface areas of segments 38 and 39 is preferably between about 40% and 50% of the combined surface areas of segments 35, 36 and 37.

The included angle of conical plane A, indicated in FIG. 3 as angle a, is preferably about 7°, thus being some 40% larger than the 5° taper of prior art frustoconical die members. Of course, the included angle of taper of bore surface portion 24, which is matingly engaged by the surfaces of segments 35, 36 and 37 in the assembled condition of the elements, is equal to angle a.

Tests have been performed to determine the force necessary to dislodge a die member which has been placed while at room temperature in a cross-head body at a temperature of 325° F. The die was inserted fully into the axial bore of the heated body to bring the external surface of the die member into fully mating engagement with the opposing surface of the body. While the body was still heated, axial force was applied to the die member until it dislodged from the body. Measured torque was applied to a 1" diameter, 16 threads per inch screw advanced against a brass pad bearing on the front of the die member. On average, 49 foot pounds of torque was required to dislodge a standard, 5° taper die member. This is an undesirable amount of pressure which may result in extensive damage to the components. The same test performed with a die member having two axial segments with surfaces recessed from the conical plane of die member-body bore engagement, the total surface areas of the recessed segments being about 45% of the surface area of the mating segments, required an average of 38 foot pounds of torque. A die member having both the recessed segments and a 7° taper required only 23 foot pounds of torque for dislodgement in the same test.

Thus, the amount of force applied to the die member in order to dislodge it from the body bore is significantly reduced from prior art levels by either providing recessed areas on the external surface of the die or by increasing the angle of taper of the mating surface portions of the die member and body bore. However, by incorporating both of these features, the required force is less than half that required to dislodge typical prior art die members of this type, and is well within acceptable limits.

What is claimed is:

1. In cross-head die apparatus having a body member with a through, axial bore extending between rear and front ends, a forward portion of said axial bore extending rearwardly from said forward end and tapering outwardly therefrom in a first, conical plane, said body member also having at least one radial bore through which a flowable coating material is injected into said axial bore, a die member positioned within said axial bore substantially at said forward end thereof, said die member having an orifice through which a filamentary member is concentrically moved, and wall means defining a flow path for said coating material within said axial bore from said radial bore to said orifice to pass through said orifice as a coating layer uniformly surrounding said filamentary member, a portion of said flow path being defined by an internal surface of said die member lying entirely in a second, conical plane tapering inwardly toward said orifice, the improvement comprising:

an external surface of said die member having a first portion in opposed, mating engagement with said forward portion of said axial bore in said first, conical plane, and a second portion having a surface area between 40% and 50% of the surface area of said first portion lying in a third, conical plane concentrically within said first, conical plane in spaced relation to said axial bore, and entirely isolated from said flow path by the mating surfaces of said first portion of said die member external surface and said forward portion of said axial bore, and wherein said first, conical plane tapers at an included angle of about 7°.

2. In cross-head die apparatus having a body member with a through, axial bore extending between rear and forward ends, at least an axial segment of said axial bore extending rearwardly from said forward end lying in a conical plane, said body member further having a radial bore for injecting a flowable coating material into said axial bore at a position between said rear and forward ends and means defining a flow path for said coating material toward said forward end, the improvement comprising:

a one-piece die member having an orifice through which a filamentary member and a flowable coating material are moved to apply a uniform coating layer to said filamentary member and an external surface at least a portion of which is configured for mating engagement with said axial segment of said axial bore in said conical plane, characterized by said external surface tapering at an included angle of about 7°.

3. The improvement of claim 2 wherein said external surface includes a first portion lying in said conical plane and a second portion lying entirely inside said conical plane, in spaced relation to said axial bore and entirely isolated from said flow path.

4. The improvement of claim 3 wherein said external surface extends between front and back ends lying in parallel, flat planes perpendicular to the axis of said conical plane and said spaced parts of said first surface portion extend from both said front and back ends.

5. The improvement of claim 4 wherein the surface area of said second portion is between 40% and 50% of the surface area of said first portion.

6. In cross-head die apparatus having a body member with a through, axial bore extending between rear and front ends, a forward portion of said axial bore extending rearwardly from said forward end and tapering outwardly therefrom in a first, conical plane, said body member also having at least one radial bore through which a flowable coating material is injected into said axial bore, a die member positioned within said axial bore substantially at said forward end thereof, said die member having an orifice through which a filamentary member is concentrically moved, and wall means defining a flow path for said coating material within said axial bore from said radial bore to said orifice to pass through said orifice as a coating layer uniformly surrounding said filamentary member, a portion of said flow path being defined by an internal surface of said die member lying entirely in a second, conical plane tapering inwardly toward said orifice, the improvement comprising:

an external surface of said die member having a first portion in opposed, mating engagement with said forward portion of said axial bore in said first, conical plane, and a second portion having a surface area between 40% and 50% of the surface area of said first portion lying in a third, conical plane concentrically within said first, conical plane in spaced relation to said axial bore, and entirely isolated from said flow path by the mating surfaces of said first portion of said die member external surface and said forward portion of said axial bore, and wherein said second portion lies axially between spaced parts of said first portion.

7. In cross-head die apparatus having a body member with a through, axial bore extending between rear and front ends, a forward portion of said axial bore extending rearwardly from said forward end and tapering outwardly therefrom in a first, conical plane, said body member also having at least one radial bore through which a flowable coating material is injected into said axial bore, a die member positioned within said axial bore substantially at said forward end thereof, said die member having an orifice through which a filamentary member is concentrically moved, and wall means defining a flow path for said coating material within said axial bore from said radial bore to said orifice to pass through said orifice as a coating layer uniformly surrounding said filamentary member, a portion of said flow path being defined by an internal surface of said die member lying entirely in a second, conical plane tapering inwardly toward said orifice, the improvement comprising:

an external surface of said die member having a first portion in opposed, mating engagement with said forward portion of said axial bore in said first, conical plane, and a second portion having a surface area between 40% and 50% of the surface area of said first portion lying in a third, conical plane concentrically within said first, conical plane in spaced relation to said axial bore, and entirely isolated from said flow path by the mating surfaces of said first portion of said die member external surface and said forward portion of said axial bore, and wherein said first portion includes first, second and third axially spaced parts, and said second portion includes fourth and fifth axially spaced parts, said fourth part lying between said first and second parts, and said fifth part lying between said second and third parts.

8. The improvement of claim 7 wherein said first, conical plane tapers at an included angle of at least 7°.

* * * * *